Figures 1, 2, 3, 4, 5:
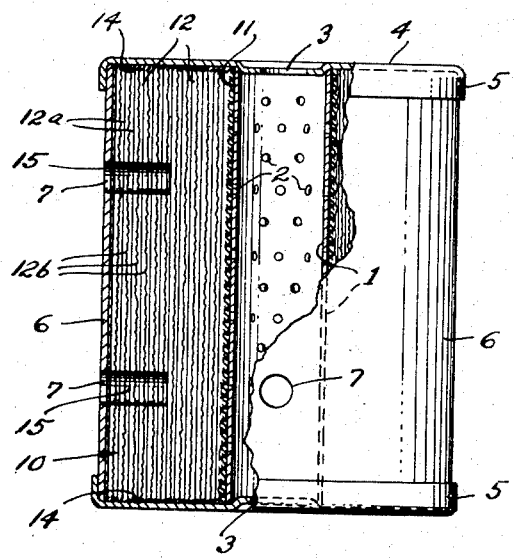

Jan. 9, 1951  R. H. HUNTER  2,537,897
FILTER ELEMENT
Filed July 9, 1947

INVENTOR
ROBERT H. HUNTER
BY
ATTORNEY

Patented Jan. 9, 1951

2,537,897

UNITED STATES PATENT OFFICE 2,537,897

FILTER ELEMENT

Robert H. Hunter, Gates Mills, Ohio

Application July 9, 1947, Serial No. 759,727

8 Claims. (Cl. 210—169)

The invention relates to an improvement in filter elements or cartridges and to a new and efficient method of manufacture thereof, thus indicating the principal objects.

A specific object is to provide an efficient and low cost filter element or member having a distributing manifold and primary or coarse-particle filtration means and a secondary or fine-particle filtration means especially adapted and arranged to operate only on such pre-cleansed filtrate.

Another object is to provide a filter member wherein roll-laminated filter sheet stock now available on a commercial basis at low cost is used to provide primary or coarse-particle filtration or isolation at or near the region of introduction of the filtrate during dispersion or distribution thereof to secondary filtration portions of the filter member especially adapted and arranged for fine-particle filtration or isolation.

Further objects include provision of an inexpensive but highly efficient and economically disposable filler or cartridge for reception by a known type of engine-lubricating-oil filtering apparatus; a filter cartridge, the principal part of which is made from inexpensive rolled-up foraminous sheeting such as plain and/or creped cellulose sheet stock similar to or identical with toilet or so-called cleansing tissue and provided in a practicable manner with means to insure (a) initial penetration of the raw filtrate (e. g. contaminated lubricating oil) deeply into the filter body and (b) dispersion of such raw filtrate into contact with relatively large areas of individually and successively acting filter sheets for passage of the dispersed filtrate substantially uniformly through and not merely between the filter sheets, the filtering process being carried out with a practical minimum of possibility of sealing off of liquid entrance passages, as by sludge or solid impurities, whereby to avoid rendering of the interior of the filter or portions thereof inaccessible for continued efficient filtering operation at low flow-producing pressures.

The preferred method of making the filter cartridge, indicating a further object, is to roll or wind appropriate filter web material, such for example as soft or creped cellulose stock (or both in alternate layers), continuously about a rigid hollow perforate core adapted to serve as a main outlet duct for the filtrate until the desired radial filter body thickness appropriate to the work is obtained; then to provide a casing around said body sealing its ends axially of the roll so that the raw filtrate cannot by-pass the filter body, as from one layer to the next, and finally providing as by drilling a limited number of filtrate-dispersion apertures or channels into the filter body from the outside (e. g. radially) to such distance from the core that the raw filtrate is dispersed or distributed by the apertures axially and circumferentially of the body between such of the filter sheets as are intersected by the apertures or channels and meanwhile and thereby is subjected to a first stage of filtration (including to a large extent passage of the filtrate through sheets comprising the radially outer portions of the filter body) and, in turn, is subjected to a second stage of filtration by being forced to pass successively through a multiplicity of inner filter sheets which are not intersected by any openings except the substantially microscopic ones existing in the filter sheet material or materials as formed.

When the filter sheet or web material comprises alternate layers of creped and soft cellulose sheet stock, the creped stock provides minute but adequate channels communicating directly with the dispersion apertures of the primary filter body for enhanced freedom of flow of the filtrate, particularly edgewise of the sheet stock, during the first filtration stage. Other sheet or web material can be used effectively and the secondary filtration layers (those not intersected by the dispersion apertures) would ordinarily be selected to possess greater capacity for holding back or isolating small particles than the primary filtration layers, or some of them, which primary filtration layers, in case the filtrate is lubricating oil, would be selected or arranged or treated so as to tend to retain only the relatively larger particles and sludge (emulsion or agglomeration of oil, water and foreign matter).

The sheet material for at least one filtration stage is preferably wet-strengthened by known means (e. g. the pulp may be treated with synthetic resin such as Melamine to avoid disintegration of the sheet stock in the presence of excess water. If, for example, alternate layers of creped and soft sheet stock are used, it is preferable to wet-strengthen only the creped stock so that the water-absorption qualities of the soft sheet stock and the strengthening and form-retaining qualities of the creped stock will have full effect. Both or either may, of course, be wet-strengthened.

Referring to accompanying drawing showing a typical construction of outside-to-inside flow filter cartridge made in accordance herewith: Figure 1 is a side elevation of the cartridge partly in central section through two of the dispersion apertures and the perforate or foraminous central supporting tube; Fig. 2 is a plan view similarly in partial section; Fig. 3 is a relatively enlarged fragmentary section through one side of a cartridge according to Fig. 1; Fig. 4 is a plan view generally similar to Fig. 2, showing non-radial distributing or dispersion apertures; and Fig. 5 is a fragmentary radial and longitudinal sectional view showing a modification of the cartridge casing.

The central core tube 1, Fig. 1, may be metal, plastic or fiber stock with suitable passages, as at 2, the tube being open at its ends for communication with central oil-outlet openings 3 in the cup-shaped (e. g. metal) end closure caps or walls 4 of the cartridge. Rim portions 5 of the end walls telescope and are secured to margins of an outer protective side wall or shell, (e. g. sheet metal), 6. The cartridge cooperates with the oil filter apparatus as usual, the end walls being provided with gaskets or other suitable means, not shown, enabling (e. g.) presentation of the oil to be filtered exclusively through apertures in the casing wall 6 and conduction of the filtered oil exclusively from one or both of the outlet openings 3. The oil, in the illustrated unit, is introduced into the cartridge at inlet openings 7 in the casing wall 6 and flow as usual is induced by maintenance of a suitable pressure differential between the inlet and the outlet openings of the cartridge.

The filter body 10, as shown, comprising one layer or a few layers of barrier material 11 such as woven metal or cloth fabric surrounding the tube 1 about which the cellulose sheeting 12 is wound continuously under any suitable tension depending upon the compactness required by the contamination of the raw filtrate, its required rate of flow, etc. The tension may, for further example, be varied to obtain greater compactness at either the outside or the inside portions of the roll. The straight vertical lines 12a represent soft cellulose stock, per attached sample Exhibit 1, and the wavy lines 12b represent crinkled or creped stock. The crepe stock, if used in an outside-to-inside flow filter cartridge, serves its special purpose explained above primarily at the outside of the roll 10, and may be limited for functional purposes so as to be radially coextensive only with the primary or first stage filtration zone P, Fig. 3, indicating the depth of the filtrate-distribution or dispersion openings 15 in the roll, described later. The secondary filtration zone is bracketed S, Fig. 3.

The varying tension on the stock mentioned above produces, for example, a relatively dense secondary filtration body around the center tube and a less dense body more suitable for primary filtration in the region of the manifold, passage 15.

In an inside-to-outside filtrate flow cartridge, the elements described above are reversed in arrangement and operative effects.

Principally in order to facilitate assembly into the shell 6, the body or roll 10 may have a binder and/or "scuff" layer 13 of one or more layers of any appropriately strong and preferably pliable, material such as craft paper applied thereover and secured to itself as by adhesive, so that the size of the roll is maintained and its surface protected for easy insertion into the shell 6, or the shell 6 may be formed as just described to serve as the outside wrapping for the filter material.

Sealing material such as water and oil repellant adhesive 14 (e. g. water and oil repellant synthetic resin of any appropriate type or class) is applied by brushing, dipping, spraying or otherwise, to the ends of the roll or body 10, so that the filtrate cannot by-pass the filtration surfaces and escape to the outlet openings 2 between the filter body and the end closure 4. Such sealing material can be applied as a strip coating in single or multiple roll forming (e. g. winding) operations. "Multiple" (above) indicates formation of several filter bodies from a single wide sheet, to be later cut apart to form individual cartridge-charging units.

The ends of the tubular filter body 12 formed as explained above can also be sealed by axial and/or radial compression of the end portions only of the body, see concentric ribs or corrugations 20 and 21 in a typical end cap 4a, Fig. 5, until the foramina in the sheet stock are substantially closed against passage of the filtrate therethrough, or at least contaminating particles suspended by the filtrate. Fig. 5 also shows crimping of the cap material as at 23 around the end margins of the central tube 2. The crimping may flare or be conical (inwardly or outwardly of the axis of the tube) to interlock the cap and tube against separation axially of the tube.

The diameter, depth, direction and surface characteristics of the dispersion apertures or channels 15 are important, but are variable in accordance with the particular filtration problem encountered. For ordinary internal combustion engine lubricating oil and in a cartridge or cannister measuring approximately 4" x 5" in diameter and height respectively, the openings are recommended to be between ¼" and ⅜" in diameter and, for good results under average conditions, (assuming the sheet stock is uniform and wound at uniform tension) should penetrate to about half the thickness of the rolled filter material. The openings 15 can be made deeper as the density of the layers unpenetrated by the openings 15 is increased, as by tighter winding near the core tube, and the diameters of apertures can be reduced as the average percentage of solid and congealable material in the raw filtrate is reduced. The openings may be of any cross-sectional shape and may be non-radial as exhibited at 15a, Fig. 4. The non-radial arrangement of openings of a particular cross section increases the exposed reception area for the filtrate.

In early experiments, dispersion apertures intended to correspond to 15 hereof were made by punching them into the formed roll, and attempts were made to form the sheet stock with holes that would register and form dispersion passages as the material was rolled up. Neither expedient proved satisfactory. The punched openings too greatly compacted the sheet material defining the dispersion openings, resulting in almost immediate sealing with sludge. Unpredictable stretch in the sheet material prevented even approximate registration of preformed holes with each other; and, even though repeated attempts were made with the view to clearing the resulting tortuous and, in some cases, sealed-off channel passages (after winding of the pre-perforated strip into roll form) the results were unsatisfactory because the unsupported projecting portions of the sheet material tended unpredictably to seal the spaces between the sheets against entrance of the filtrate.

Satisfactory results (present solution) were obtained by forming the dispersion channels 15 by drilling wound rolls of cellulose stock, as described above, with a hollow paper drill so that the edges of the formed openings were comparatively smooth and all the severed material was removed. The same result might be obtained by the use of some other type of hole-forming instrument or tool.

The openings 7 in the cartridge wall 6, if of metal or relatively rigid and strong material, can be used as guides for the drill or perforating tool.

In operation, see Fig. 3, the contaminated oil enters the dispersion openings 15, as indicated, and first flows in all directions normal to the axes of said openings and parallel to the sheet stock between the sheets 12a and/or 12b. Continued flow, parallel to the sheet stock, is blocked either by barrier means (as at 14) or by counterflow of the raw filtrate; and, as indicated by the arrows on Fig. 3, the raw filtrate, after partial cleansing by removal of the relatively larger contaminating particles during relatively easy passage between the sheets 12a and/or 12b, is finally subjected to the second stage of filtration substantially uniformly over the entire area of the unpierced filter body material 12.

In case creped material is used in the filter body, the general direction of the minute channels afforded by the creped material may be circumferential, axial or obliquely of the roll, and the spacing of the dispersion channels from each other and from the sealed ends of the roll may be modified in accordance with the particular arrangement chosen. For example, if the creping channels run circumferentially of the roll, then the rows of dispersion apertures 15 would appropriately be spaced apart axially of the roll farther in proportion to the circumferential spacing than in case the creeping channels ran parallel to the roll axis, thus to provide shorter distribution paths (parallel to the principal planes of the filter layers) crosswise of the channels than lengthwise thereof, proportionate to the greater resistance to flow crosswise of the channels.

While the present invention, as illustrated, is not intended for use in filter apparatus in which the raw filtrate is introduced at the center of a tubular body of filtering material, comparable results (functionally only) may be secured by winding a plurality of strips of foraminous material such as described (forming a first stage filtration body) about a rigid perforate central core tube 11, the strips being spaced axially of such tube to provide dispersion channels of annular form. The annular bodies of primary filter material may then be bridged with some rigid and perforate material (or a pre-formed tube thereof) as a support for further layers of filter material to constitute an outer wrapped-on body serving for second stage filtration. The supporting tube for such second stage filtration layers could be woven wire cloth. The process just described is much more expensive than the illustrated embodiment.

As examples of the soft cellulose sheet stock and creped cellulose sheet stock described above reference is made to "Kimpack No. 201" and "No. 254 Wipestock," respectively, as manufactured at the date of this application by Kimberly Clark Corporation of Chicago, Illinois.

I claim:

1. A filter element in the form of a roll composed of a very large number of thin foraminous fibrous sheets held in mutual contact to form separate superimposed primary and secondary filtering bodies each of substantial thickness and concentric with each other, the sheets of the primary body having sufficiently rough main face surfaces to maintain filtrate receiving channels therebetween, means defining a recess exposed simultaneously to all the channels of the primary body and forming a filtrate conducting manifold in open communication with said channels of the primary body for confining and introducing raw filtrate to the channels for dispersal over said main primary sheet faces, sheet edge sealing means associated with the primary and secondary bodies and operating to confine the filtrate against free egress from between the sheets of both bodies so that the filtrate thus dispersed must flow through sheets of the primary toward and through the sheets of the secondary body.

2. The filter element according to claim 1, wherein the sheet stock of one of the bodies comprises alternate layers of creped and soft fibrous cellulose material.

3. The filter element according to claim 1, wherein the sheets of one of the bodies comprises alternate layers of wet strengthened fibrous sheet stock and water absorptive fibrous sheet stock.

4. A filter unit comprising a tubular member of foraminous filter web material having an inside annular portion and an intimately associated outside annular portion, each operatively exposed at one of its peripheral surfaces, means sealing the unit at its ends against passage of filtrate therethrough, said member having filtrate-inlet and dispersion openings intersected by the edges of the web material of one annular portion only and extending a substantial distance radially thereof from its exposed surface, the other annular portion being imperforate except for minute transverse channels which characterize the web material thereof as foraminous.

5. The unit according to claim 4 wherein the web material of one annulus is soft foraminous paper stock and crinkled or creped foraminous paper stock in alternate layers.

6. The unit according to claim 4 wherein the web material of both annular portions is cellulose stock of a thickness on the order of that of toilet tissue or cleansing tissue.

7. The unit according to claim 4 wherein at least part of the web material of the said "imperforate" annulus is wet-strengthened cellulose sheet stock.

8. The arrangement according to claim 4 wherein the web material comprises alternate layers of soft water-absorptive cellulose stock of a thickness comparable to that of tissue paper and crepe wet-strengthened cellulose stock of comparable original thickness.

ROBERT H. HUNTER.

REFERENCES CITED

The following references are of record in the file of this patent:

UNITED STATES PATENTS

| Number | Name | Date |
|---|---|---|
| 1,565,988 | Cottrell | Dec. 15, 1925 |
| 2,115,577 | Goldman | Apr. 26, 1938 |
| 2,138,383 | Little et al. | Nov. 29, 1938 |
| 2,210,397 | Dreiss | Aug. 6, 1940 |
| 2,218,339 | Manning | Oct. 15, 1940 |
| 2,339,703 | Kamrath | Jan. 18, 1944 |
| 2,346,903 | Caffrey | Apr. 18, 1944 |
| 2,386,684 | Hermanson | Oct. 9, 1945 |
| 2,427,733 | McCann | Sept. 23, 1947 |
| 2,464,870 | Kamrath | Mar. 22, 1949 |